United States Patent
Huang

(10) Patent No.: US 9,866,094 B2
(45) Date of Patent: Jan. 9, 2018

(54) FLUID DRIVEN ELECTRIC GENERATOR

(71) Applicant: Kuo-Chang Huang, Tainan (TW)

(72) Inventor: Kuo-Chang Huang, Tainan (TW)

(*) Notice: Subject to any disclaimer, the term of this patent is extended or adjusted under 35 U.S.C. 154(b) by 0 days.

(21) Appl. No.: 15/267,821

(22) Filed: Sep. 16, 2016

(65) Prior Publication Data

US 2017/0117783 A1    Apr. 27, 2017

(30) Foreign Application Priority Data

Oct. 27, 2015    (TW) .............................. 104135190 A

(51) Int. Cl.
| | |
|---|---|
| *F03D 9/00* | (2016.01) |
| *H02K 16/00* | (2006.01) |
| *F03D 9/25* | (2016.01) |
| *F03B 13/14* | (2006.01) |
| *F03B 13/26* | (2006.01) |
| *F03D 3/06* | (2006.01) |
| *H02K 7/18* | (2006.01) |
| *F03D 3/02* | (2006.01) |

(52) U.S. Cl.
CPC ........... *H02K 16/005* (2013.01); *F03B 13/14* (2013.01); *F03B 13/26* (2013.01); *F03D 3/02* (2013.01); *F03D 3/06* (2013.01); *F03D 3/064* (2013.01); *F03D 9/25* (2016.05); *H02K 7/1823* (2013.01); *F05B 2210/16* (2013.01); *F05B 2240/21* (2013.01); *F05B 2240/211* (2013.01); *Y02E 10/38* (2013.01); *Y02E 10/74* (2013.01)

(58) Field of Classification Search
None
See application file for complete search history.

(56) References Cited

U.S. PATENT DOCUMENTS

| | | | | | |
|---|---|---|---|---|---|
| 4,057,270 | A | * | 11/1977 | Lebost | F03D 3/02 290/42 |
| 4,073,516 | A | * | 2/1978 | Kling | F03D 13/20 244/33 |
| 4,088,352 | A | * | 5/1978 | Kling | F03D 1/00 290/55 |
| 5,760,515 | A | * | 6/1998 | Burns | F03D 9/00 180/65.31 |
| 5,783,894 | A | * | 7/1998 | Wither | H02K 16/00 310/156.26 |

(Continued)

FOREIGN PATENT DOCUMENTS

| | | | | |
|---|---|---|---|---|
| DE | 3844505 A1 | * | 7/1990 | ............. F03D 1/025 |
| TW | M502286 U | | 6/2015 | |

*Primary Examiner* — Tulsidas C Patel
*Assistant Examiner* — S. Mikailoff
(74) *Attorney, Agent, or Firm* — Muncy, Geissler, Olds & Lowe, P.C.

(57) ABSTRACT

A fluid driven electric generator includes a shaft, an inner tubular member rotatably surrounding the shaft, an outer tubular member rotatably surrounding the inner tubular member, a plurality of first blade modules driven by a fluid flow to bring rotation of the inner tubular member only in a first rotational direction, and a plurality of second blade modules driven by a fluid flow to bring rotation of the outer tubular member only in an opposite second rotational direction. At least one power generating unit includes inner and outer rotors coupled with the inner and outer tubular members, respectively, so as to be rotated in opposite rotational directions to induce a current.

6 Claims, 9 Drawing Sheets

(56) References Cited

U.S. PATENT DOCUMENTS

| | | | | |
|---|---|---|---|---|
| 6,278,197 B1* | 8/2001 | Appa | ............... | F03D 1/025 |
| | | | | 290/54 |
| 6,492,743 B1* | 12/2002 | Appa | ............... | F01D 1/32 |
| | | | | 290/44 |
| 6,761,144 B2* | 7/2004 | Schwam | ............ | B64D 27/02 |
| | | | | 123/242 |
| 8,772,958 B2* | 7/2014 | Kang | ............... | F03D 1/025 |
| | | | | 290/55 |
| 9,184,649 B2* | 11/2015 | Webster | ............ | H02K 16/00 |
| 2003/0146627 A1* | 8/2003 | Parviainen | ............ | F03B 3/00 |
| | | | | 290/54 |
| 2011/0027084 A1* | 2/2011 | Rekret | ............... | F03D 3/02 |
| | | | | 416/126 |
| 2011/0049894 A1* | 3/2011 | Green | ............... | F03D 3/005 |
| | | | | 290/52 |
| 2012/0326539 A1* | 12/2012 | Webster | ............ | H02K 16/00 |
| | | | | 310/46 |
| 2014/0008915 A1* | 1/2014 | Ribarov | ............ | F03D 1/025 |
| | | | | 290/55 |
| 2015/0295481 A1* | 10/2015 | Harris | ............ | H02K 16/005 |
| | | | | 290/43 |
| 2016/0218592 A1* | 7/2016 | Huang | ............ | H02K 7/1823 |
| 2016/0230744 A1* | 8/2016 | Boyle | ............... | F03D 1/025 |
| 2017/0117783 A1* | 4/2017 | Huang | ............... | F03D 9/25 |
| 2017/0198678 A1* | 7/2017 | Bakanov | ............ | F03D 1/025 |

* cited by examiner

FLUID DRIVEN ELECTRIC GENERATOR

CROSS-REFERENCE TO RELATED APPLICATION

This application claims priority of Taiwanese Patent Application No. 104135190, filed on Oct. 27, 2015.

FIELD

The disclosure relates to an electric generator, and more particularly to a fluid driven electric generator using a fluid flow, such as winds, tides, and ocean currents, to rotate blades for generating electric power.

BACKGROUND

Referring to FIGS. 1 and 2, a conventional fluid driven electric generator as disclosed in Taiwanese Utility Model No. M502286 includes a base unit 9, a driving unit 8 and at least one power generating unit 7. The base unit 9 includes a shaft 91. The driving unit 8 includes a tubular member 81 surrounding the shaft 91, and a plurality of blade modules 82 disposed on the tubular member 81. The power generating unit 7 includes a stator 72 fixed on the shaft 91, and a rotor 71 coupled with the tubular member 81. The blade modules 82 are driven by a fluid flow to rotate the rotor 71 relative to the stator 72 so as to produce an induced electric current. Since the rotational speed of the rotor 71 relative to the stator 72 is limited depending on the fluid flow, it is difficult to enhance the power generating efficiency. In other words, it is required to increase amounts of coil windings of the power generating unit 7 in producing an expected electricity quantity, which results in a relatively high material cost.

SUMMARY

Therefore, an object of the disclosure is to provide a fluid driven electric generator that can alleviate at least one of the drawbacks of the prior art.

According to the disclosure, the fluid driven electric generator includes a shaft extending along an axis, and a rotating unit including an inner tubular member which surrounds the shaft and which is rotatable about the shaft, and an outer tubular member which surrounds the inner tubular member and which is rotatable relative to the inner tubular member. A driving unit includes a plurality of first blade modules coupled with the inner tubular member and disposed to be driven by a fluid flow to bring rotation of the inner tubular member only in a first rotational direction, and a plurality of second blade modules coupled with the outer tubular member and disposed to be driven by a fluid flow to bring rotation of the outer tubular member only in a second rotational direction that is opposite to the first rotational direction. At least one power generating unit includes an inner rotor coupled with the inner tubular member to be rotated therewith in the first rotational direction, and interposed between the inner and outer tubular member in a transverse direction transverse to the axis, and an outer rotor coupled with the outer tubular member to be rotated therewith in the second rotational direction, and interposed between the inner rotor and the outer tubular member in the transverse direction. The inner and outer rotors are configured to induce a current when rotation relative to each other occurs.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
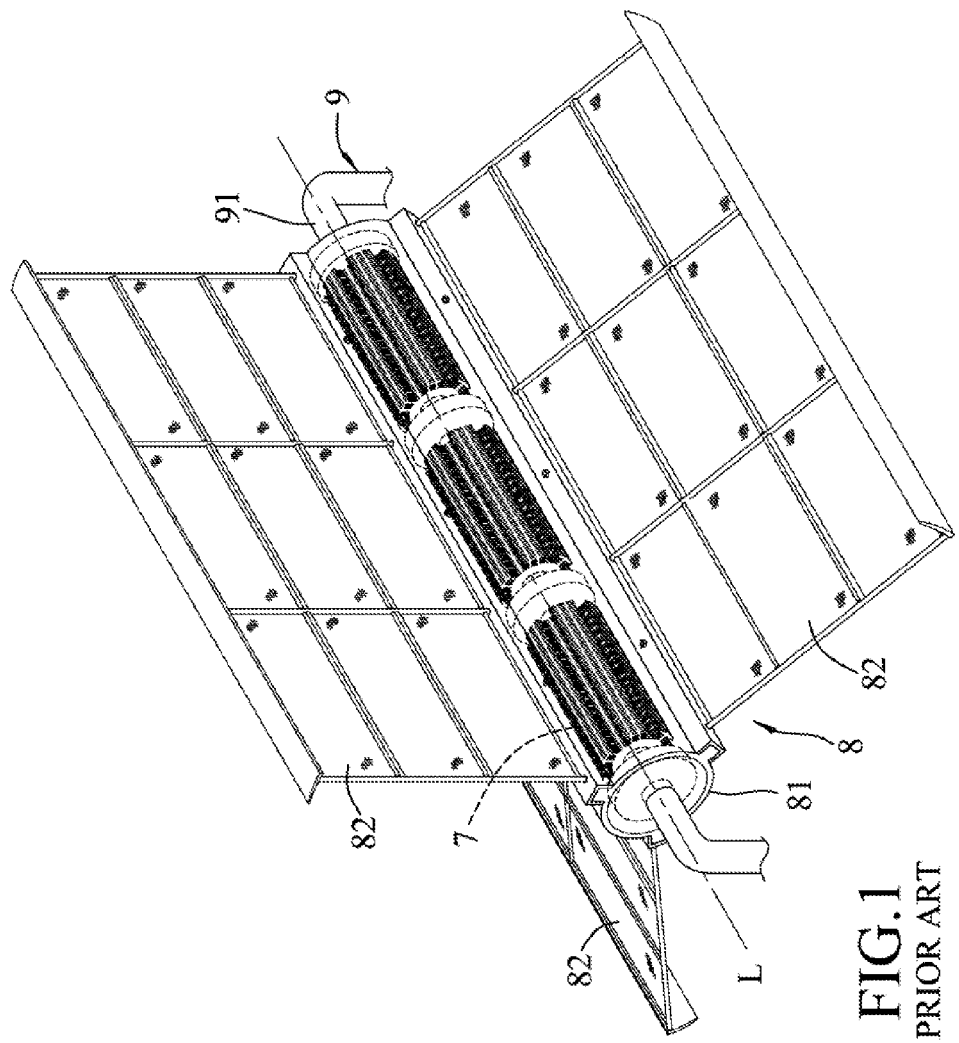
FIG. 1 is a fragmentary perspective view of a conventional electric generator.
Figure 2:
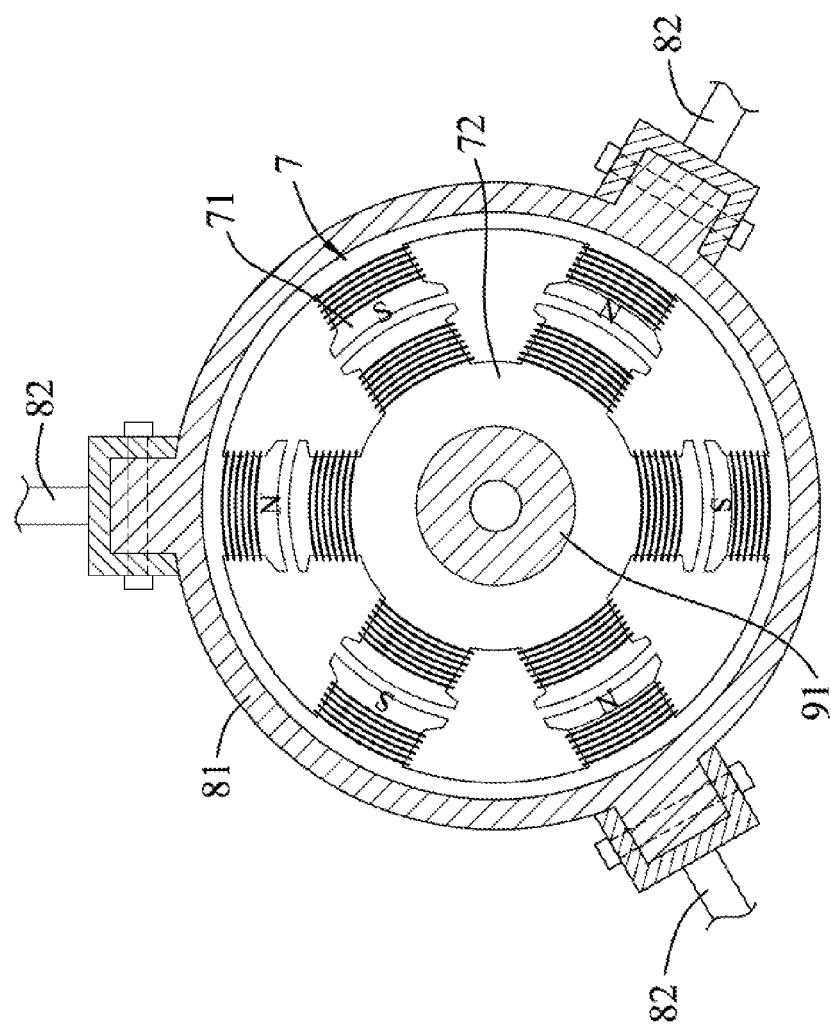
FIG. 2 is a fragmentary sectional view of the conventional electric generator.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
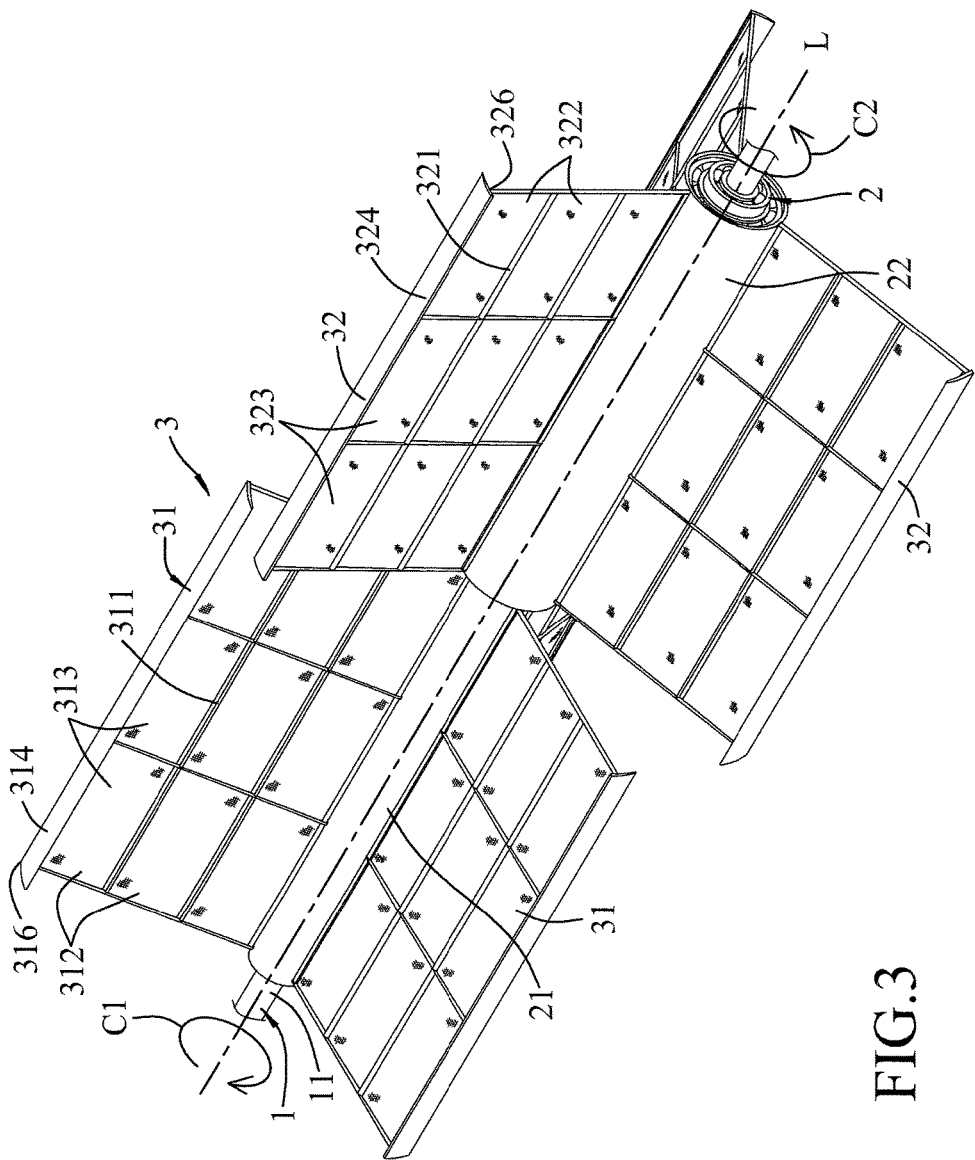
FIG. 3 is a fragmentary perspective view of a first embodiment of a fluid driven electric generator according to the disclosure.
Figure 4:
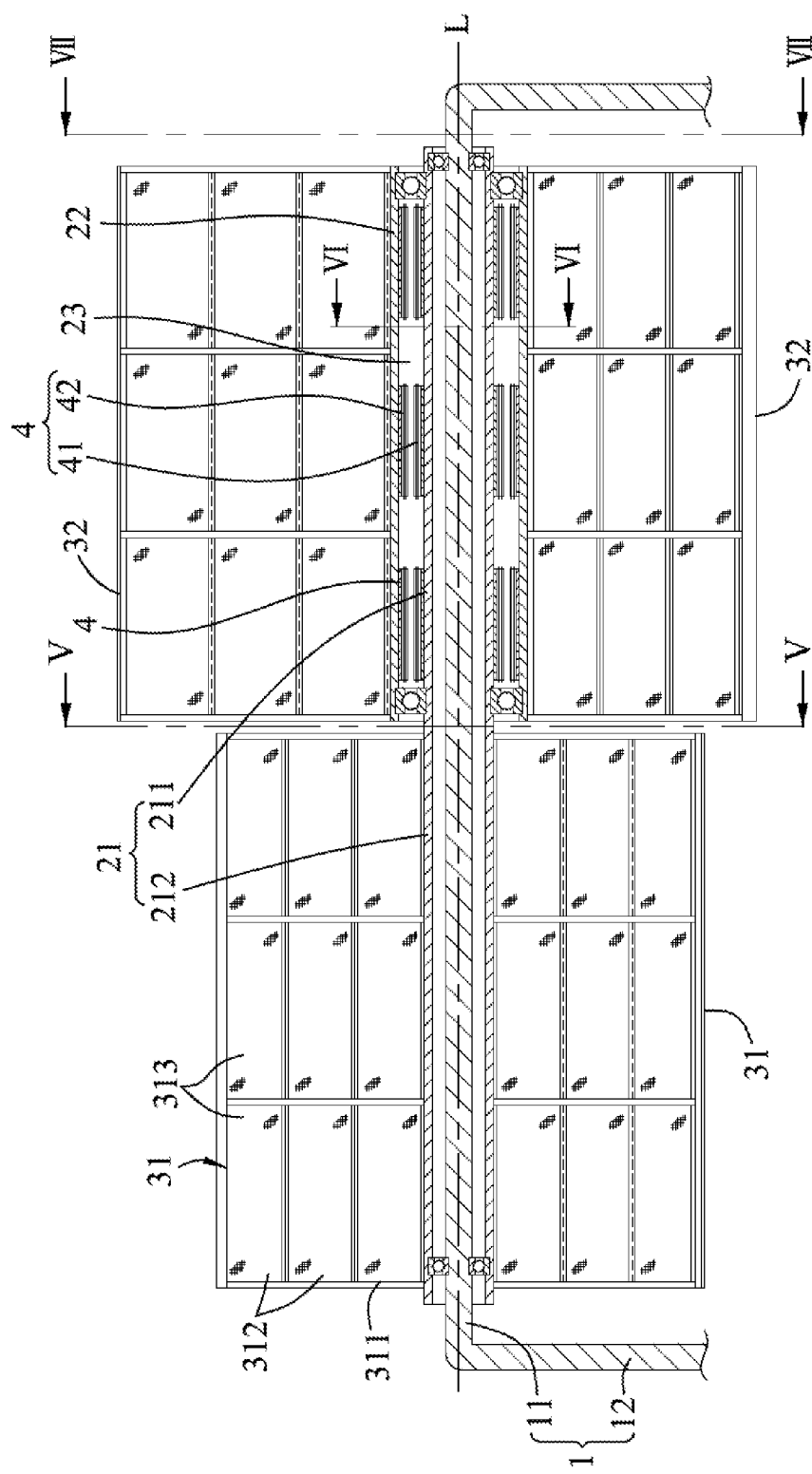
FIG. 4 is a fragmentary sectional view of the first embodiment.

Referring to FIGS. 3 and 4, a first embodiment of the fluid driven electric generator according to this disclosure includes a base unit 1, a rotating unit 2, a driving unit 3 and at least one power generating unit 4 (three power generating units 4 in this embodiment).

The base unit 1 includes a shaft 11 extending along an axis (L), and a support member 12 disposed to support two ends of the shaft 11. The support member 12 is configured to extend downwardly from the shaft 11, or to be of a Y-shape. In this embodiment, the shaft 11 is elongated in a left-and-right direction to have the axis (L) extend horizontally. Alternatively, the two ends of the shaft 11 may be respectively directly mounted on two spaced-apart buildings for holding the rotational unit 2. The support member 12 can be rotatably mounted on the ground surface, and the base unit 1 can be rotated by means of a fluid-guiding plate (not shown) to permit the fluid driven electric generator to face the fluid flow.

The rotating unit 2 includes an inner tubular member 21 which surrounds the shaft 11 and which is rotatable about the shaft 11, and an outer tubular member 22 which surrounds the inner tubular member 21 and which is rotatable relative to the inner tubular member 21. The inner tubular member 21 has a first power generating segment 211 which is surrounded by the outer tubular member 22 and which cooperates with the outer tubular member to define an annular power generating space 23 therebetween, and a first driving segment 212 which extends from the first power generating segment 211 along the axis (L) and outwardly of the power generating space 23. The inner tubular member 21 is coupled with the shaft 11 by means of bearings so as to be rotatable relative thereto. The outer tubular member 22 is coupled with the inner tubular member 21 by means of bearings so as to be rotatable relative thereto. In this embodiment, the shaft 11 is elongated horizontally and the fluid driven electric generator is of a horizontal-axis type.

Figure 5:
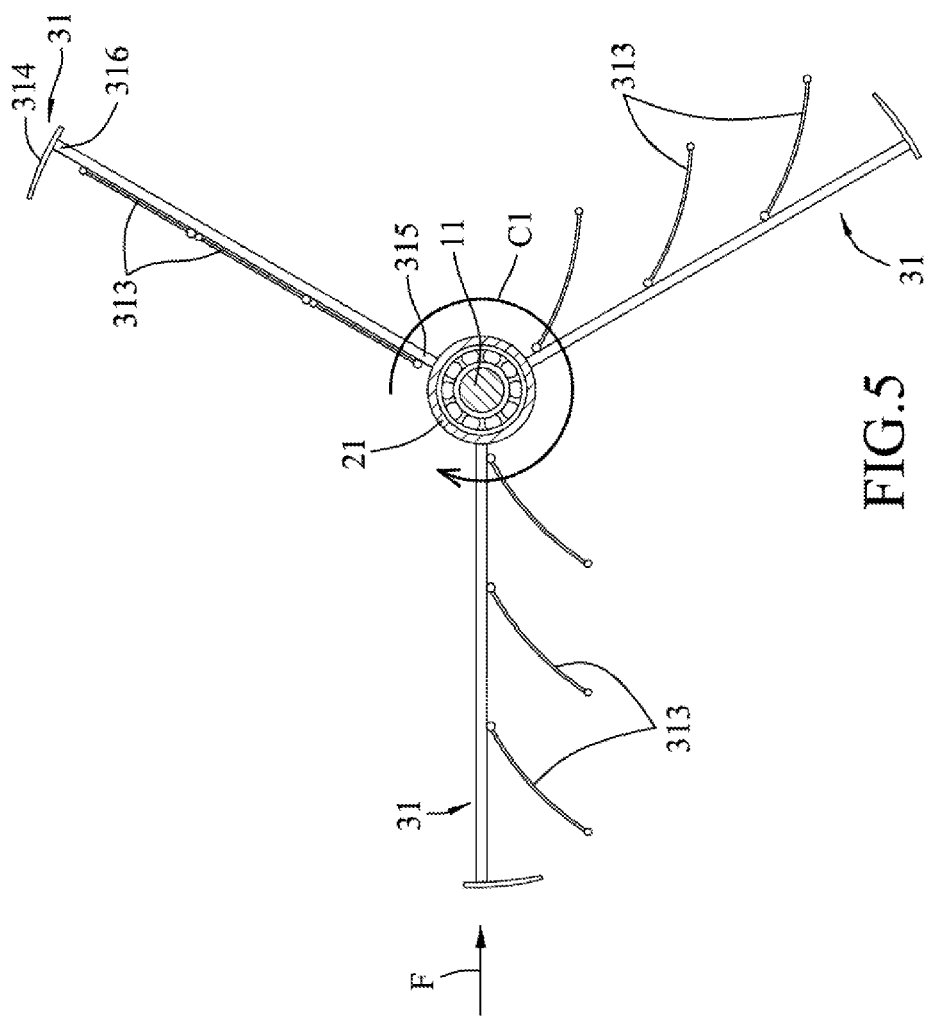
FIG. 5 is a schematic sectional view taken along line V-V of FIG. 4.

The driving unit 3 includes a plurality of first blade modules 31 mounted on the first driving segment 212 of the inner tubular member 21, and a plurality of second blade modules 32 mounted on the outer tubular member 22. The first blade modules 31 are driven by a fluid flow to bring rotation of the inner tubular member 21 only in a first rotational direction (C1). The second blade modules 32 are driven by a fluid flow to bring rotation of the outer tubular member 22 only in a second rotational direction (C2) that is opposite to the first rotational direction (C1). Referring to FIGS. 3 and 5, in this embodiment, each of the first blade modules 31 has the same structure as that of each of the second blade modules 32, while being mounted in a direction different from that of the second blade modules 32. Three first blade modules 31 of grid-type and three second blade modules 32 of grid-type are mounted on the inner tubular member 21 and the outer tubular member 22, respectively.

Specifically, each of the first blade modules 31 has a grid frame 311 that defines a plurality of penetrating spaces 312, a plurality of vanes 313 each of which is pivotally connected to the grid frame 311 to openably cover the respective penetrating space 312, and a curve deflector 314. Each vane 313 is turned to open the respective penetrating space 312 only in a rotational direction counter to the first rotational direction (C1). Thus, when the vanes 313 are rotated along with the grid frame 311 in the first rotational direction (C1), each vane 313 is attached to the grid frame 311 to cover the respective penetrating space 312 so as to provide a large thrust surface area. When the vanes 313 are subjected to a press force in a direction counter to the first rotational direction (C1), each vane 313 is turned away from the respective penetrating space 312.

The grid frame 311 extends radially and outwardly from the inner tubular member 21 to terminate at an outer flange 316. The curve deflector 314 extends from the outer flange 316 in a rotational direction counter to the first rotational direction (C1) so as to guide a fluid flow in the first rotational direction (C1) to increase torque generated from the inner tubular member 21. Similarly, each of the second blade modules 32 has a grid frame 321 extending radially and outwardly from the outer tubular member 22 to terminate at an outer flange 326, and a curve deflector 324 which extends from the outer flange 326 in a rotational direction counter to the second rotational direction (C2) so as to guide a fluid flow in the second rotational direction (C2) to increase torque generated from the outer tubular member 22.

As shown in FIG. 5, when a force (F) is applied to the electric generator in a front-and-rear direction, an upper one of the first blade modules 31 which faces the force (F) is driven to rotate in the first rotational direction (C1), while the vanes 313 of a lower one of the first blade modules 31 and a front one of the first blade modules 31 are turned open so as to render the rotation of the first blade modules 31 smooth.

Thus, in this embodiment, the vanes 313, 323 of each first blade module 31 and each second blade module 32 are mounted to turn so as to open the respective penetrating space 312, 322 in the directions counter to each other, thereby making the first blade modules 31 and the second blade modules 32 rotate in different rotational directions (i.e., in the first rotational direction (C1) and the second rotational direction (C2)), respectively.

Figure 6:
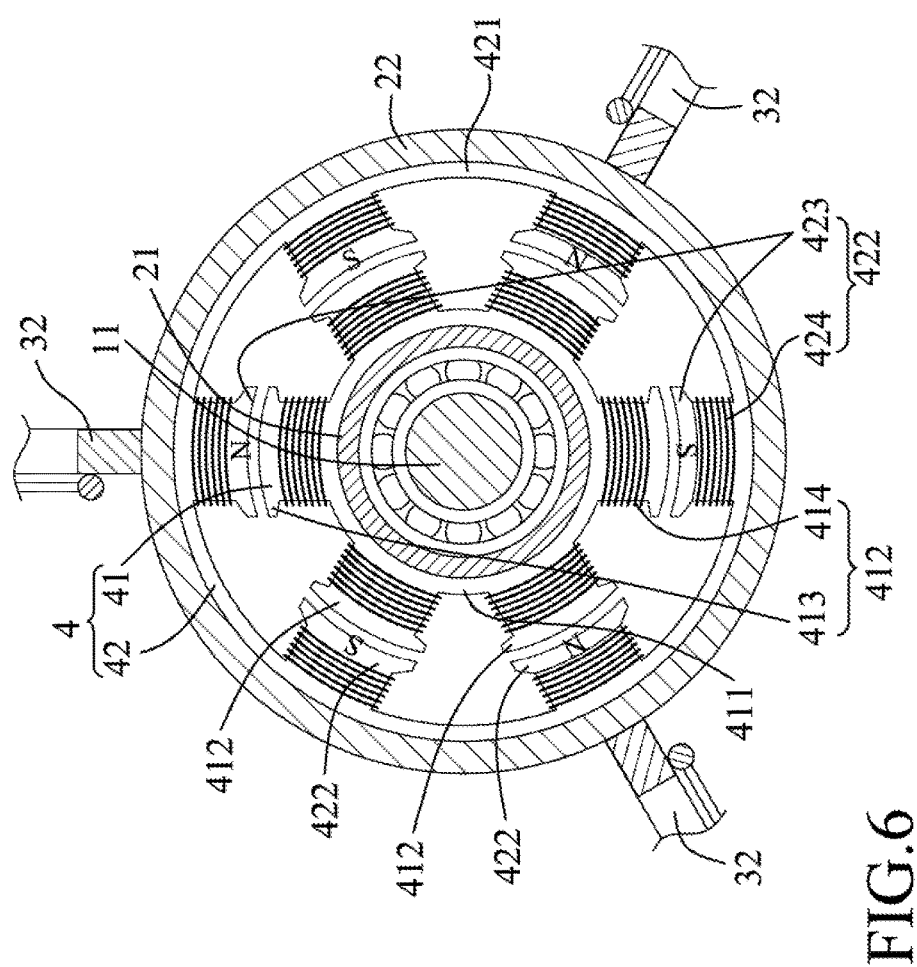
FIG. 6 is a schematic sectional view taken along line VI-VI of FIG. 4.

Referring to FIGS. 4 and 6, the power generating units 4 are displaced from each other along the axis (L). Each power generating unit 4 includes an inner rotor 41 mounted on the first power generating segment 211 of the inner tubular member 21 to be rotated therewith in the first rotational direction (C1), and interposed between the inner and outer tubular members 21, 22 in a transverse direction transverse to the axis (L), and an outer rotor 42 mounted on an inner tubular surface of the outer tubular member 22 to be rotated therewith in the second rotational direction (C2), and interposed between the inner rotor 41 and the outer tubular member 22 in the transverse direction.

The inner rotor 41 has an inner surrounding seat 411 mounted on and surrounding an outer tubular surface of the first power generating segment 211, and three armature winding assemblies 412 disposed on the inner surrounding seat 411 and angularly and equidistantly spaced apart from each other. Each armature winding assembly 412 has two armature core seats 413 disposed on an outer surrounding surface of the inner surrounding seat 411 and diametrically opposite to each other, and an armature coil 414 wound around the armature core seats 413. In this embodiment, the armature core seats 413 are integrally formed with the inner surrounding seat 411 for facilitating assembly and fabrication thereof. Alternatively, the armature core seats 413 may be mounted on the outer tubular surface of the first power generating segment 211 instead of the inner surrounding seat 411.

In this embodiment, the armature core seats 413 and the inner surrounding seat 411 are formed from a plurality of identical magnetic conductive sheets that are stacked along the axis (L) and that are made of a magnetic conductive material. Alternatively, the armature core seats 413 and the inner surrounding seat 411 may be formed as one-single piece. The armature coils 414 are Y-connected or delta-connected.

The outer rotor 42 has an outer surrounding seat 421 mounted on and surrounded by the inner tubular surface of the outer tubular member 22, and three magnetic pole pairs 422 disposed on the outer surrounding seat 421 and angularly and equidistantly spaced apart from each other. Each magnetic pole pair 422 has two magnetic core seats 423 disposed on an inner surrounding surface of the outer surrounding seat 421 and diametrically opposite to each other, and a field coil 424 wound around the magnetic core seats 423 for producing a magnetic field. In this embodiment, the magnetic core seats 423 are integrally formed with the outer surrounding seat 421 for facilitating assembly and fabrication thereof. Alternatively, the magnetic core seats 423 may be mounted on the inner tubular surface of the outer tubular member 22 instead of the outer surrounding seat 421.

In this embodiment, the magnetic core seats 423 and the outer surrounding seat 421 are formed from a plurality of identical magnetic conductive sheets that are stacked along the axis (L) and that are made of a magnetic conductive material. Alternatively, the magnetic core seats 423 and the outer surrounding seat 421 may be formed as one-single piece.

The field coils 424 generate magnetic fields when an electric power is supplied. Alternatively, the field coils 424 may be separately excited, series excited, shunt excited or compound excited to generate magnetic fields. Still alternatively, each magnetic pole pair 422 may be configured as a pair of permanent magnets.

When the magnetic pole pairs 422 of the outer rotor 42 are rotated relative to the armature winding assemblies 412 of the inner rotor 41, a current is induced from the armature coils 414 and may be output by means of a plurality of slip rings (not shown). The armature coils 414 may be connected electrically to a rectifier (not shown) for converting the output alternating current to a direct current.

In this embodiment, each power generating unit 4 includes three magnetic pole pairs 422 and three armature winding assemblies 412, so that this embodiment is configured as a three-phase six-pole electric generator. In another variation, the number of the magnetic pole pairs 422 and the armature winding assemblies 412 may be changed depending on different needs.

Figure 7:
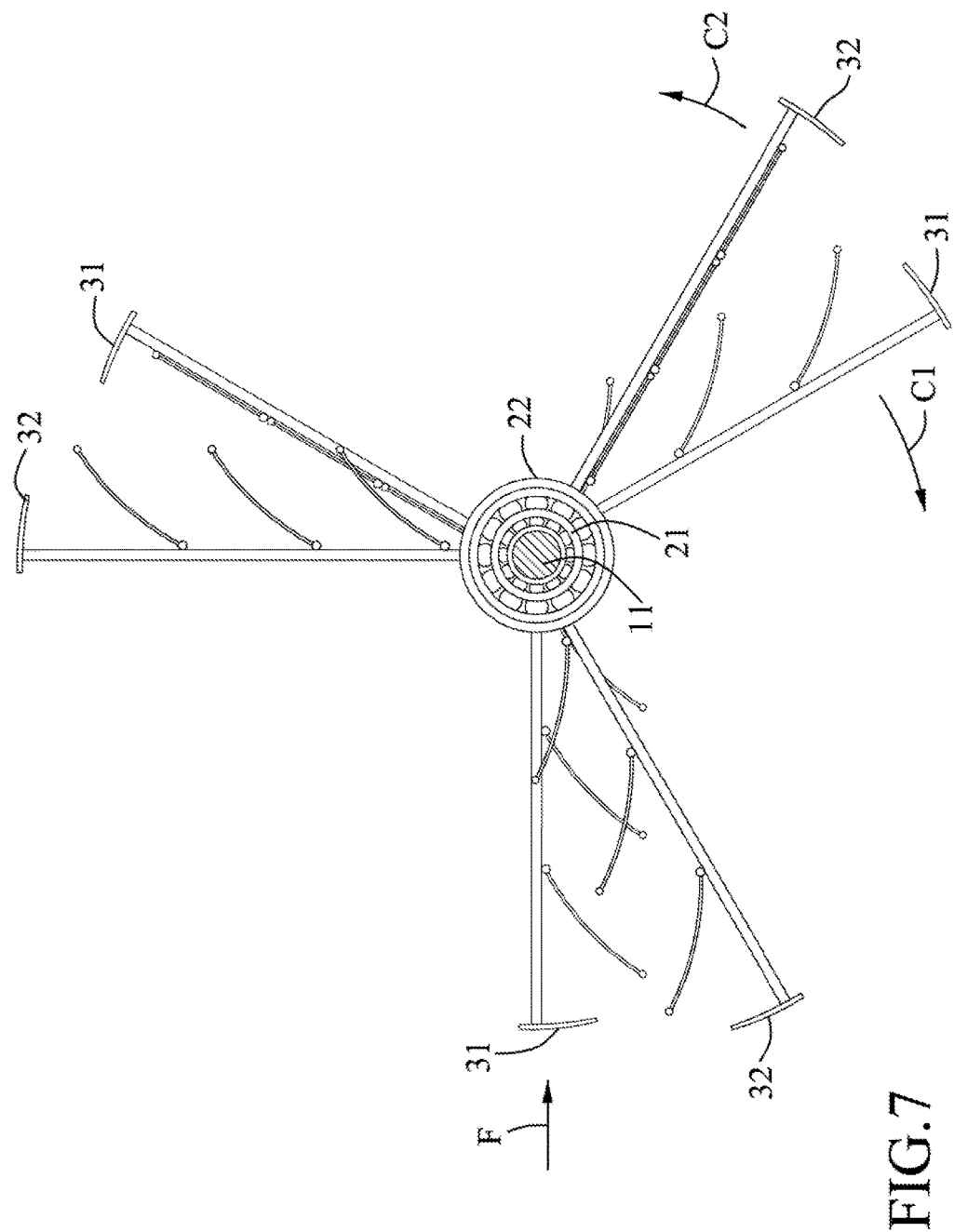
FIG. 7 is a schematic sectional view taken along line VII-VII of FIG. 4.

Referring to FIGS. 3, 6 and 7, in use, when an external force in the direction (F) generated by wind, tide or ocean current propels the driving unit 3, the first blade modules 31 are driven to rotate the inner tubular member 21 as well as the inner rotor 41 in the first rotational direction (C1), and the second blade modules 32 are driven to rotate the outer tubular member 22 as well as the outer rotor 42 in the second rotational direction (C2). A current is induced when the relative rotation of the outer rotor 42 to the inner rotor 41 occurs.

Since the outer rotor 42 and the inner rotor 41 are rotatable in two opposite rotational directions, the relative rotational speed between the outer rotor 42 and the inner rotor 41 is greatly increased so as to greatly enhance the power generating efficiency. Hence, as compared with the conventional power generator which can produce the same electricity quantity as that of this embodiment, the amounts of the coil windings of the armature coils 414 and the field coils 424 in this embodiment are relatively low, thereby reducing the manufacturing and material costs.

In another variation, the inner rotor 41 may have three magnetic pole pairs disposed on the outer tubular wall of the inner tubular member 21, and the outer rotor 42 may have three armature winding assemblies disposed on the inner tubular wall of the outer tubular member 22, such that an induced current is produced in response to the rotation of the inner rotor 41 relative to the outer rotor 42.

Figure 8:
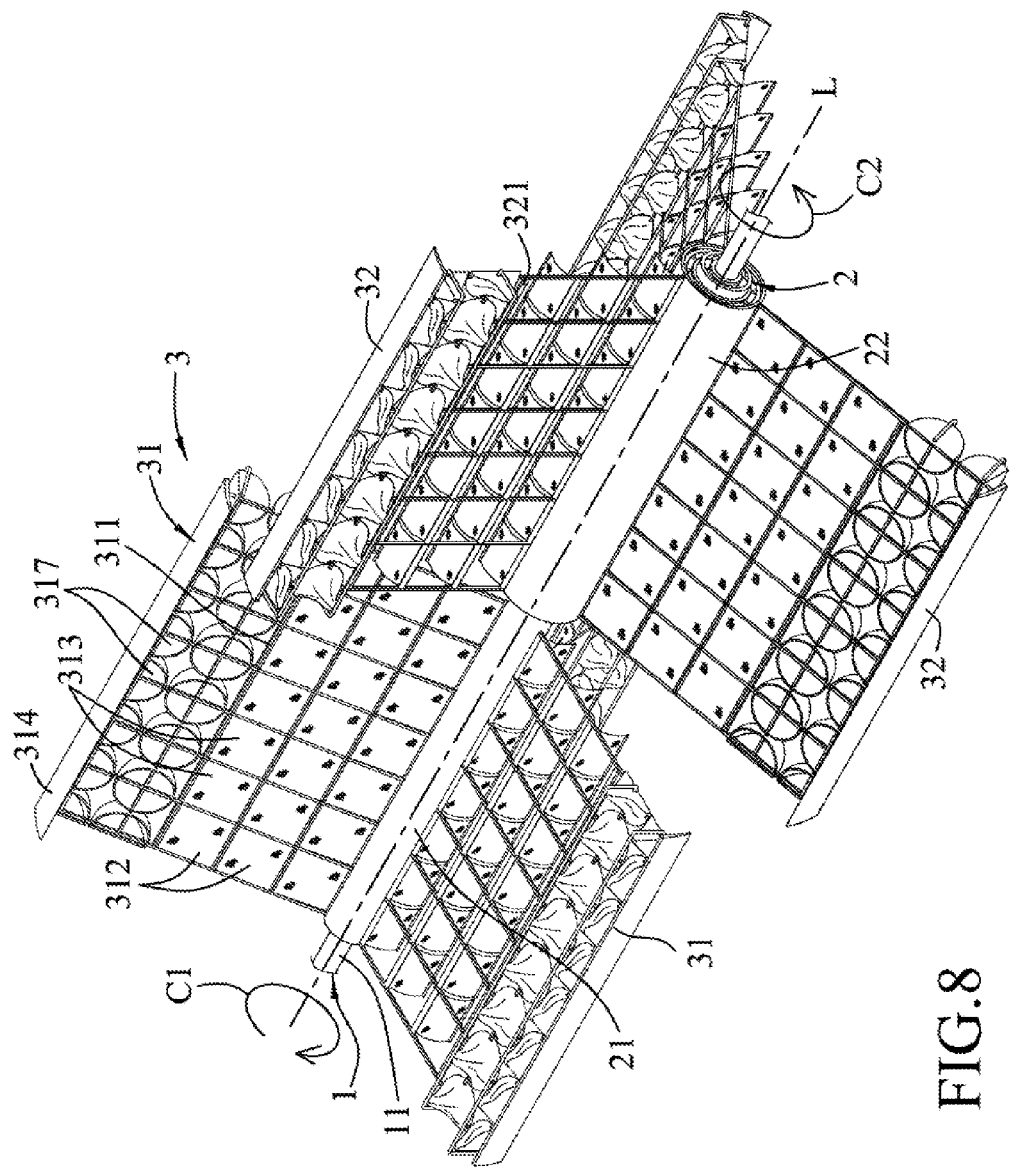
FIG. 8 is a fragmentary perspective view of a second embodiment of the fluid driven electric generator according to the disclosure.

Referring to FIG. 8, in a second embodiment of this disclosure, each of the first and second blade modules 31, 32 has a grid frame 311, 321 that has an extending frame portion elongated radially and outwardly, and further has a plurality of bowl-shaped wind cups 317 disposed on the extending frame portion. Alternatively, each first blade module 31 may only have a plurality of the vanes 313 disposed on the grid frame 311, and each second blade module 32 may only have a plurality of the wind cups 317 disposed on the grid frame 321, or vice versa.

Figure 9:
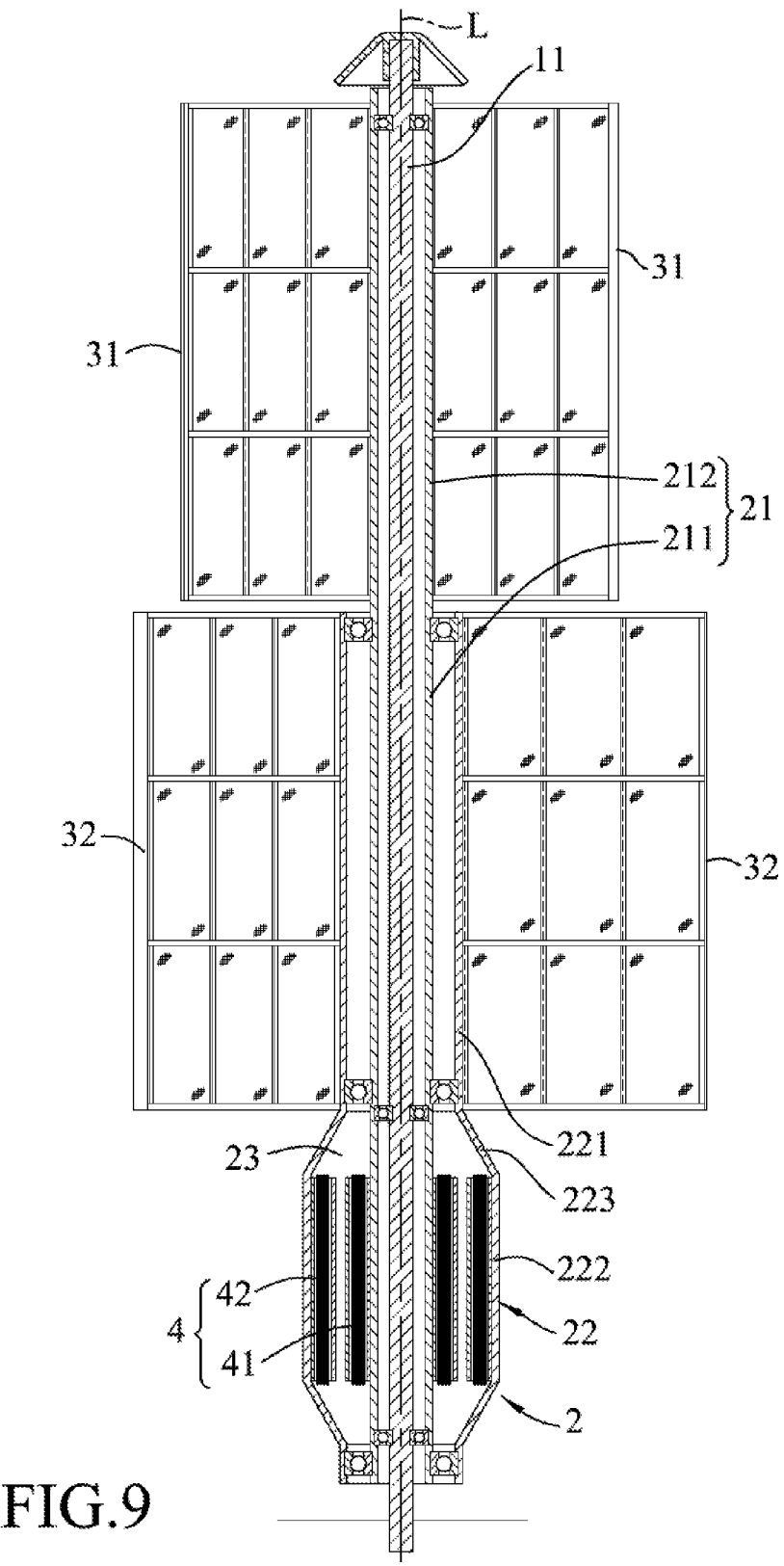
FIG. 9 is a fragmentary sectional view of a third embodiment of the fluid driven electric generator according to the disclosure.

Referring to FIG. 9, in a third embodiment of this disclosure, the shaft 11 is elongated in an up-and-down direction to have the axis (L) extend vertically, so that the electric generator of this embodiment is a vertical-axis generator. An upright column is mounted on a ground surface at a predetermined site to serve as the shaft 11, such as a support pole for electric wires, street light, a building, etc., a tree trunk, or the like. The shaft 11 may be triangular, quadrangular, cylindrical, or H-shaped in cross-section. The first driving segment 212 extends upwardly from the first power generating segment 211. The outer tubular member 22 has a smaller-diameter second driving segment 221 on which the second blade modules 32 are mounted, a larger-diameter second power generating segment 222 which is spaced apart from and disposed downwardly of the second driving segment 221 and which cooperates with the inner tubular member 21 to define the power generating space 23 therebetween, and a shoulder segment 223 which interconnects the second driving segment 221 and the second power generating segment 222 and which is configured to diverge downwardly.

The vertical-axis generator of this embodiment can be driven by a wind that blows in an arbitrary direction so as to be suitable for aerial or ground use, thereby rendering the electric generator more market competitive. Besides, the outer tubular member 22 may be configured to cover and guard the power generating units 4 from rain, dew or snow. Since water of rain, dew and snow can flow down along the shoulder segment 223, water accumulation on the generator can be prevented.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fluid driven electric generator comprising:
a shaft extending along an axis;
a rotating unit including an inner tubular member which surrounds said shaft and which is rotatable about said shaft, and an outer tubular member which surrounds said inner tubular member and which is rotatable relative to said inner tubular member;
a driving unit including a plurality of first blade modules coupled with said inner tubular member and disposed to be driven by a fluid flow so as to bring rotation of said inner tubular member only in a first rotational direction, and a plurality of second blade modules coupled with said outer tubular member and disposed to be driven by a fluid flow so as to bring rotation of said outer tubular member only in a second rotational direction that is opposite to the first rotational direction; and
at least one power generating unit including:
an inner rotor coupled with said inner tubular member to be rotated therewith in the first rotational direction, the inner rotor interposed between said inner and said outer tubular members in a transverse direction transverse to the axis, and
an outer rotor coupled with said outer tubular member to be rotated therewith in the second rotational direction, with said outer rotor interposed between said inner rotor and said outer tubular member in the transverse direction, said inner and outer rotors being configured to induce an electric current when rotation relative to each other occurs;

wherein said inner tubular member has:
- a first power generating segment which is surrounded by said outer tubular member to cooperate with said outer tubular member for defining an annular power generating space therebetween, and
- a first driving segment which extends axially from said first power generating segment along the axis and outwardly of said power generating space and on which said first blade modules are mounted;

wherein each of said first blade modules extends in a radially outward direction from said inner tubular member to terminate at a first outer flange, and each of said first blade modules has a curved deflector extending from said first outer flange in a rotational direction counter to the first rotational direction;

wherein each of said second blade modules extends in a radially outward direction from said outer tubular member to terminate at a second outer flange, and each of said second blade modules has a curved deflector extending from said second outer flange in a rotational direction counter to the second rotational direction; and wherein each of the first blade modules and each of the second blade modules comprises a grid frame with a plurality of louvered vanes configured to respectively allow the rotation of said inner tubular member only in the first rotational direction and the rotation of said outer tubular member only in the second rotational direction.

2. The fluid driven electric generator as claimed in claim 1, wherein said shaft is elongated in a left-and-right direction to have the axis extend horizontally.

3. The fluid driven electric generator as claimed in claim 1, wherein said shaft is elongated in an up-and-down direction to have the axis extend vertically.

4. The fluid driven electric generator as claimed in claim 3, wherein said outer tubular member has a smaller-diameter second driving segment on which said second blade modules are mounted, a larger-diameter second power generating segment which is spaced apart from and disposed downwardly of said second driving segment and which cooperates with said inner tubular member to define said power generating space therebetween, and a shoulder segment which interconnects said second driving segment and said second power generating segment.

5. The fluid driven electric generator as claimed in claim 1, wherein said inner rotor has at least one armature winding assembly disposed on an outer tubular wall of said inner tubular member, said outer rotor having at least one magnetic pole pair disposed on an inner tubular wall of said outer tubular member such that the induced electric current is produced in response to the rotation of said inner rotor relative to said outer rotor.

6. The fluid driven electric generator as claimed in claim 1, wherein said inner rotor has at least one magnetic pole pair disposed on an outer tubular wall of said inner tubular member, said outer rotor having at least one armature winding assembly disposed on an inner tubular wall of said outer tubular member such that the induced electric current is produced in response to the rotation of said inner rotor relative to said outer rotor.

* * * * *